United States Patent [19]

Knox et al.

[11] Patent Number: 5,761,447
[45] Date of Patent: Jun. 2, 1998

[54] ADAPTOR CONNECTION APPARATUS FOR SIMULTANEOUSLY CONNECTING A PLURALITY OF ADAPTORS TO DIVERSE BUS ARCHITECTURES

[75] Inventors: Andrew Knox, Kilbirnie; Roger Timothy Wood, Ayshire, both of Scotland

[73] Assignee: International Business Machines Corp., Armonk, N.Y.

[21] Appl. No.: 876,359

[22] Filed: Jun. 14, 1997

Related U.S. Application Data

[63] Continuation of Ser. No. 389,527, Feb. 16, 1995, abandoned.

[30] Foreign Application Priority Data

Feb. 16, 1994 [GB] United Kingdom ............... 9402910

[51] Int. Cl.⁶ ............................. H01R 11/00; H05K 7/10; G06F 13/00
[52] U.S. Cl. ........................... 395/281; 395/283; 439/218; 361/681
[58] Field of Search ........................ 395/281, 280, 395/306, 308, 309, 822, 283; 361/802, 679, 681; 439/218

[56] References Cited

U.S. PATENT DOCUMENTS

| | | | |
|---|---|---|---|
| 4,715,820 | 12/1987 | Andrews, Jr. et al. | 439/59 |
| 5,174,762 | 12/1992 | Hoppal et al. | 439/61 |
| 5,426,739 | 6/1995 | Lin et al. | 395/309 |
| 5,440,755 | 8/1995 | Harwer et al. | 395/800 |
| 5,461,618 | 10/1995 | Chen et al. | 370/82 |
| 5,483,422 | 1/1996 | Bowen et al. | 361/802 |
| 5,497,464 | 3/1996 | Yeh | 395/200.01 |
| 5,512,886 | 4/1996 | Macko et al. | 340/825.07 |
| 5,519,851 | 5/1996 | Bender et al. | 395/500 |
| 5,530,858 | 6/1996 | Stanley et al. | 395/650 |
| 5,540,601 | 7/1996 | Botchek | 439/502 |
| 5,542,055 | 7/1996 | Amini et al. | 395/281 |
| 5,544,334 | 8/1996 | Noll | 395/309 |

FOREIGN PATENT DOCUMENTS

0117954A3  9/1984  European Pat. Off.
WO94/00970  1/1994  WIPO

OTHER PUBLICATIONS

IBM Technical Disclosure Bulletin, "Implementation of Logic Book/Cage Keys", vol. 33, No. 10b, Mar. 1991, pp. 235–241.

*Primary Examiner*—Gopal C. Ray
*Attorney, Agent, or Firm*—Andrew Dillon

[57] ABSTRACT

An adaptor connection apparatus for a data processing system having at least first and second bus architectures and a guide for receiving first and second removable adaptors. Within the guide, first and second electrical contacts are provided for simultaneously connecting the first and second adaptors to the first and second bus architectures, respectively.

22 Claims, 5 Drawing Sheets

ADAPTOR CONNECTION APPARATUS FOR SIMULTANEOUSLY CONNECTING A PLURALITY OF ADAPTORS TO DIVERSE BUS ARCHITECTURES

This is a continuation of application Ser. No. 08/389,527, filed Feb. 16, 1995, abandoned.

BACKGROUND OF THE INVENTION

1. Technical Field

The present invention relates in general to a data processing apparatus and in particular to an adaptor connection apparatus for a data processing system.

2. Description of the Related Art

Many examples of data processing systems, such as personal computer systems for example, each comprise a system unit including a random access memory (RAM), a read only store (ROS), a central processing unit (CPU), display adaptor for connecting a display device to the system unit, a pointing device adaptor for connecting a pointing device such as a mouse, tablet, touch screen or the like to the system unit, a keyboard adaptor for connecting a keyboard to the system unit, and a mass storage device such as a hard disk drive or tape streamer for example, all interconnected by a system bus. In addition, the system unit typically comprises one or more similar input/output (I/O) ports linked to the system bus for connecting additional adapters to the system bus to enhance the performance of the computer system. For example, a communication adaptor may be plugged into one of the I/O ports to permit connection of the computer system to other computer systems in a network such as, for example, a token ring network.

In some conventional computer systems, the I/O ports are provided inside the system unit in the form of edge connectors linked to the system bus. However, this arrangement is inconvenient because the covers of the computer system have to be removed in order to plug in a new adaptor.

More recently, there have become available optional adapters designed in accordance with the PCMCIA standard. Examples of well-known PCMCIA adapters include additional mass storage cards and communication adaptor cards. Typically, a PCMCIA adaptor is encapsulated in a sealed rectangular container. In plan view, each PCMCIA adaptor occupies approximately the same space as a credit card. However, there are 3 Types of PCMCIA adaptor each characterized by a different thickness: Type 1 adapters are typically 3 mm thick; Type 2 adapters are approximately 5 mm thick; and type 3 are approximately 12 mm thick. A connector specified by the PCMCIA standard is provided along one end of the container. The connector is a universal 68 pin connector common to all PCMCIA adapters. In use, the end of the container carrying the connector is plugged into a slot-like socket specified by the PCMCIA standard in the housing of the computer system. The connector on the adaptor mates with a reciprocal connector at the end of the socket. The reciprocal connector in the socket is linked to the system bus via a PCMCIA expansion bus in the computer system. There are three types of socket, each corresponding in size to a different one of the three types of adaptor. A typical Type 3 socket includes a shell defining an approximately 12 mm thick slot for receiving a Type 3 PCMCIA adaptor, such as a mass storage device for example. Alternatively, two type 2 reciprocal connectors are stacked one above the other at the end of the slot. The socket there not only accommodates one Type 3 adaptor, but also a similar or mixed pair of Type 1 and Type 2 adapters.

In view of an increasing interest in motion video image processing, the Video Electronics Standard Association (VESA) has created a high speed expansion bus standard known as the VESA Media Channel (VMC) for transferring motion video data from motion video adapters into computer systems. The VMC bus can carry video data from up to fifteen external devices. Video data is placed on the VMC bus in data packets each having a header indicating the source and format of the video data.

The aforementioned additional interfacing capability provided by the PCMCIA expansion bus standard has adequate bandwidth to permit transfer of some types of data into the computer system from external devices. However, the bandwidth of the PCMCIA expansion bus is insufficient to adequately complete the VESA Media Channel between a motion video adaptor and a host computer system. It has therefore not been possible to provide the additional function offered by VMC adapters in a computer system having a PCMCIA expansion bus alone, until the present invention.

SUMMARY OF THE INVENTION

In accordance with the present invention, there is now provided an adaptor connection apparatus for a data processing system having at least first and second bus architectures. The apparatus comprises guide means for receiving first and second removable adapters; first electrical contact means located in the guide means for connecting the first adaptor to the first bus architecture; and second electrical contact means located in the guide means for connecting the second adaptor to the second bus architecture.

The adaptor connection apparatus of the present invention preferably comprises keying means for preventing connection of the first adaptor to the second bus architecture. The keying means is preferably located in the guide means. In a preferred embodiment of the present invention, the keying means comprises sensor means for sensing an identification code on the second adaptor as the second adaptor is received in the guide means and for disabling the second contact if the sensed identification code is not recognized.

Viewing the present invention from another aspect, there is now provided a data processing apparatus including a first bus architecture; a second bus architecture; a central processing unit connected to the first bus architecture; a video processor connected to the second bus architecture; and an adaptor connection apparatus. The adaptor connection apparatus comprises guide means for receiving first and second removable adapters, first electrical contact means located in the guide means for connecting the first adaptor to the first bus architecture, and second electrical contact means located in the guide means for connecting the second adaptor to the second bus architecture.

Viewing the present invention from yet another aspect, there is now provided a display apparatus comprising a housing; a display device mounted in the housing; and means for releasably mounting a removable pod containing a data processing apparatus in the housing. The data processing apparatus includes a first bus architecture, a second bus architecture, a central processing unit connected to the first bus architecture, a video processor connected to the second bus architecture, and an adaptor connection apparatus. The adaptor connection apparatus comprises guide means for receiving first and second removable adapters, first electrical contact means located in the guide means for connecting the first adaptor to the first bus architecture, and second electrical contact means located in the guide means for connecting the second adaptor to the second bus architecture. The display device further comprises means for connecting the video processor of the data processing system to the display device when the removable pod is mounted in the housing.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
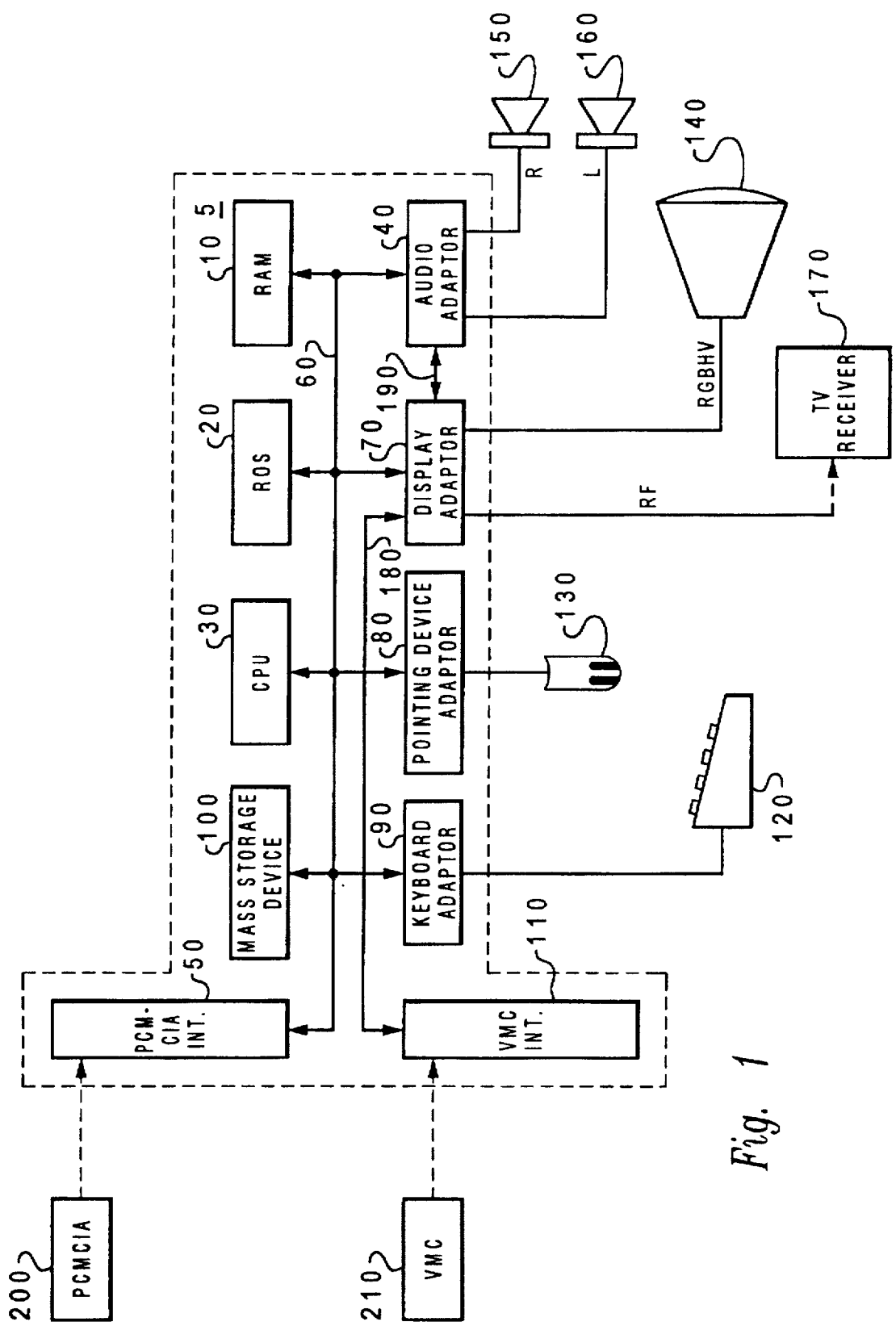
FIG. 1 depicts in accordance with a preferred embodiment of the present invention is a block diagram of a computer system of the present invention.

Referring first to FIG. 1, a computer system comprises a system unit 5 including a random access memory (RAM) 10, a read only store (ROS) 20, a central processing unit (CPU) 30 such as an Intel 80486 microprocessor for example, an audio adaptor 40, a display adaptor 70, a pointing device adaptor 80, a keyboard adaptor 90, a PCMCIA interface 50, and a mass storage device 100 such as a hard disk drive or tape streamer for example, all interconnected by a system bus 60. A VESA Media Channel (VMC) interface 110 is connected to display adaptor 70 independently of system bus 60 by a VMC bus 180. An audio channel 190 between display adaptor 70 and audio adaptor 40 permits transmission of audio from display adaptor 70 to audio adaptor 40. System unit 5 is connectable via adaptor 90 to a keyboard 120. A pointing device 130 such as a touch screen, a tablet, or a mouse can be connected to system unit 5 via pointing device adaptor 80. System unit 5 is also connectable via display adaptor 70 to a visual display unit 140 such as a cathode ray tube (CRT) display or a liquid crystal display for example. System unit 5 is further connectable via display adaptor 70 to a television receiver 170, video tape recorder or the like.

At least one PCMCIA adaptor 200 can be connected to system unit 5 via interface 50. PCMCIA adaptor 200 may be an additional hard disk drive or a communication adaptor such as for example a token ring adaptor for linking system unit 5 to other computer systems to form a computer network. Alternatively, PCMCIA adaptor 200 may be a modem for linking system unit 5 to a telephone network. Similarly, at least one VMC adaptor 210 can be connected to system unit 5 via VMC interface 110. VMC adaptor 210 may for example be a television tuner module, a MPEG video receiver, an S-video receiver, or a video games module. VMC adaptor 210 is preferably similar in physical form to a conventional PCMCIA adaptor 200. Specifically, VMC adaptor 210 is encapsulated in a sealed rectangular container. In plan view, VMC adaptor 210 occupies approximately the same space as a credit card. However, there are 3 Types of VMC adaptor 210, each characterized by a different thickness: Type 1 VMC adapters are typically 3 mm thick; Type 2 VMC adapters are approximately 5 mm thick; and type 3 are approximately 12 mm thick. A connector specified by the VMC standard is provided along one end of the container. The connector is a universal 68 pin connector common to all VMC adapters.

In operation, CPU 30 processes data stored in a combination of RAM 10 and mass storage device 100 under the control of computer program code stored in a combination of ROS 20, RAM 10, and mass storage device 100. Keyboard and mouse adapters 90 and 80 permit data and instructions to be manually entered into system unit 5 from keyboard 120 and mouse 130 respectively. Audio adaptor 40 translates output data from system unit 5 into stereo audio signals L and R for driving a pair of loudspeakers 150 and 160. Audio adaptor 40 also generates signals for driving speakers 150 and 160 in response to audio signals transmitted from display adaptor 70 via audio channel 190. Display adaptor 70 translates output data from system unit 5 into video signals, R, G and B, and horizontal and vertical picture synchronization (sync) signals, H and V, for configuring display 130 to generate a visual data output. In addition, display adaptor 70 can translate output data from system unit 5 generate a television signal RF for driving reception by, for example, a television receiver 170 or a video tape recorder. Furthermore, display adaptor 70 can generate video signals R, G, and B and sync signals, H and V, or television signal RF, in response to motion picture video data transmitted from VMC adaptor 210 via VMC interface 110 and VMC bus 180. Display adaptor 70 thus permits visual output from system unit 5 via either a domestic television receiver or a computer visual display unit. System bus 60 includes core logic (not shown) which may be hard-wired logic or a combination of hard-wired logic and computer program code for coordinating data transfer between RAM 10, ROS 20, CPU 30, storage device 100, PCMCIA interface 50, VMC interface 110, adapters 40, 90, 80 and 70, 200, and 210, and also serial and parallel printer ports (not shown).

Figure 2:
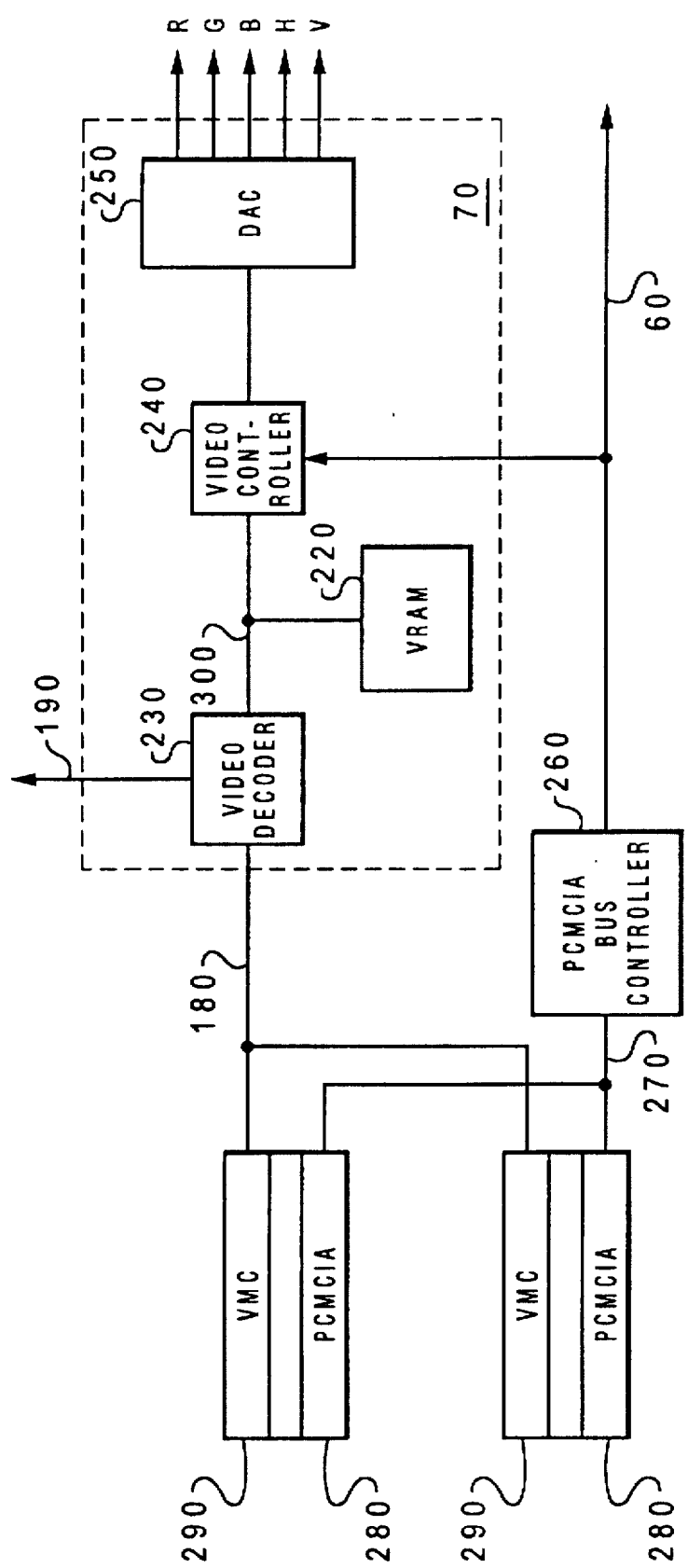
FIG. 2 is a block diagram of a video subsystem of the computer system.

Referring now to FIG. 2, the video subsystem of system unit 5 includes display adaptor 70. Display adaptor 70 includes a video decoder 230 connected to VMC bus 180; a video controller 240, such as an S3 928 video controller IC produced by S3, is connected to output of video decoder 230 and to system bus 60; and a video random access memory (VRAM) connected to video controller 240 and video decoder 230. A digital to analog convertor (DAC) 250 is connected to video controller 240. VMC interface 110 consists of a pair of connectors 290 each for engaging a separate VMC adaptor 210. PCMCIA interface 50 comprises a pair of PCMCIA connectors 280 each for engaging a separate PCMCIA adaptor 200. Connectors 280 are each connected via a PCMCIA bus 270 and a PCMCIA bus controller 260 to system bus 60.

In operation, VMC bus 180 carries decompressed digitized Y, U and V video data and possibly additional decompressed digitized audio data from a VMC adaptor 210 plugged into either of connectors 290 to video decoder 230. The audio data is extracted and sent to audio adaptor 40 via audio channel 190. Video decoder 230 decodes to Y, U, and V video data received from adaptor 210 to produce at 300 R, G, and B video data for storage in VRAM 220. Video controller 240 reads R, G and B video data from VRAM 220 and writes it to DAC 250. In turn, DAC 250 converts the R, G and B video data into analog R, G and B video signals for driving display device 140. Video controller 240 also writes to and reads from VRAM 220, data provided on system bus 60. Furthermore, video controller 240 can also scale video data stored in VRAM 220 for display in a window within the image displayed on display device 140.

Figure 3:
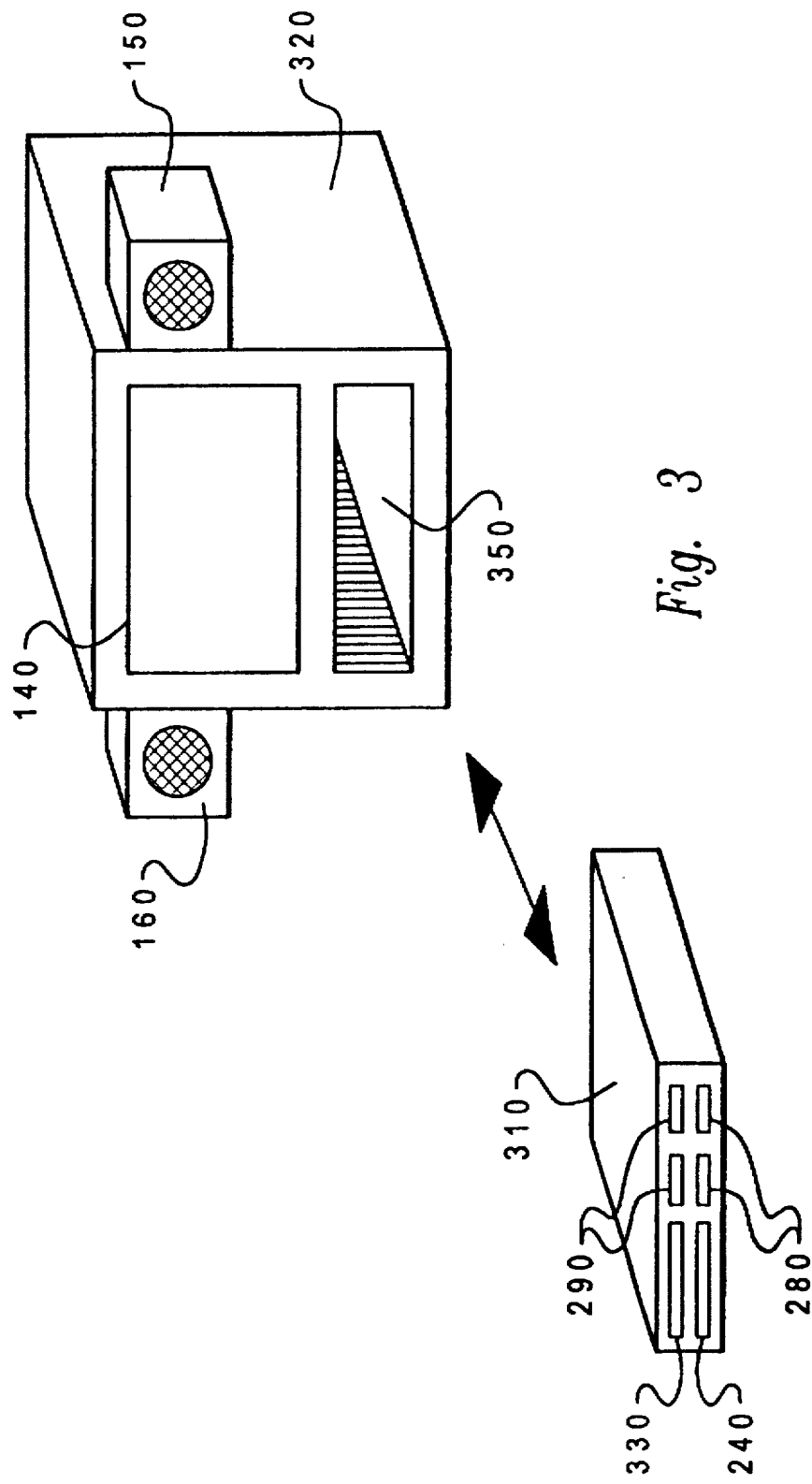
FIG. 3 is a simplified perspective view of the computer system.

Referring now to FIG. 3, a preferred embodiment of the present invention comprises a housing 320. Display device 140 is mounted in the housing. Loudspeakers 150 and 160 are mounted on the sides of housing 320. An opening 350 for receiving a pod containing system unit 5 is located in the housing beneath the screen of display device 140. Opening 350 includes guides (not shown) upon which the pod 310 slides into latching engagement with the housing. Complementary connectors (not shown) are provided on the inside of opening 350 and on the outside of pod 310 for connecting the R, G B, H and V outputs of display adaptor 70 to display device 140 and for connecting the stereo audio outputs L and R of audio adaptor 40 to loudspeakers 150 and 160. Complementary connectors (not shown) are also provided on the inside of opening 350 and on the outside of pod 310 to establish a serial communication channel from system unit 5 to display device 140 through which control data can be passed between system unit 5 and display device 140. The control data includes electronic display identification data supplied by display device 140 to system unit 5 to enable system unit 5 to determine the performance parameters of display device 140 and image parameter data supplied by system unit 5 to display device 140 to adjust the operating parameters of display device 140 such as, for example the geometry, brightness, or contrast of the displayed image. VMC and PCMCIA connectors 290 and 280 are located on the front face of pod 310 for easy insertion and replacement of VMC and/or PCMCIA adapters when the pod is located in housing 320. In this preferred embodiment of the present invention, system unit 5 further comprises an optical disk drive 330 such as a Compact Disc reader or the like and a floppy disk drive 240.

Because system unit 5 is located in removable pod 310, the overall computer system can easily be upgraded simply by replacing pod 310 with a new pod containing for example an upgraded CPU or a completely new different architecture. Furthermore, pod 310 can be used as a so-called set top box for driving a domestic television receiver 170 via television signal RF and/or audio signals L and R from display adaptor 70 remote from housing 320, loudspeakers 160 and 150 and display device 140 mounted therein. System unit 5 includes a receiver (not shown) for receiving instruction from a remote control handset. This allows the user to operate pod 310 in a similar manner to, for example, a conventional television receiver, to select a desired application such as, for example, a video game or a movie via appropriate VMC adapters plugged into the front of the pod.

Figure 4A:
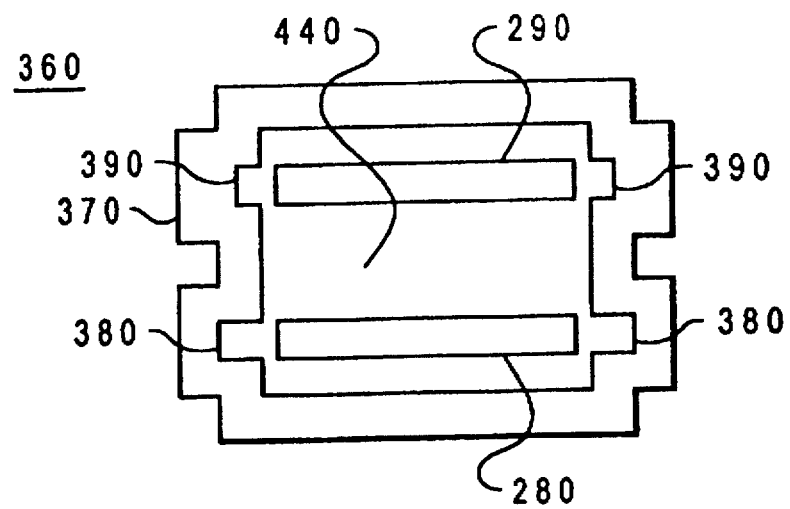
FIGS. 4A and 4B are end views of an adaptor socket for the computer system with adaptor absent and inserted respectively.

Referring now to FIG. 4A, according to a preferred embodiment of the present invention, PCMCIA connectors 280 and VMC connectors 290 are paired together. Each pair of connectors 280 and 290 is carried in a Type 3 socket 360. Use of a type 3 socket advantageously minimizes the space occupied by VMC and PCMCIA ports on the exterior of pod 310, while optimizing the number of VMC and PCMCIA adapters receivable. Socket 360 comprises a shell 370 open at one end to define a mouth 440 capable of receiving at most a Type 3 adaptor. Connectors 280 and 290 are located in stacked formation at the closed end of shell 370. VMC connector 290 is connected to VMC bus 180. PCMCIA connector 280 is connected to PCMCIA bus 270. Pairs of guides 390 and 380 in the form of grooves extend along the inside of shell 370 along opposite faces of mouth 440 from the open end of shell 270 to the closed end. Guides 380 and 390 are positioned to align the connectors of VMC and PCMCIA adapters 200 and 210 with their respective connectors 280 and 290.

Figure 4B:
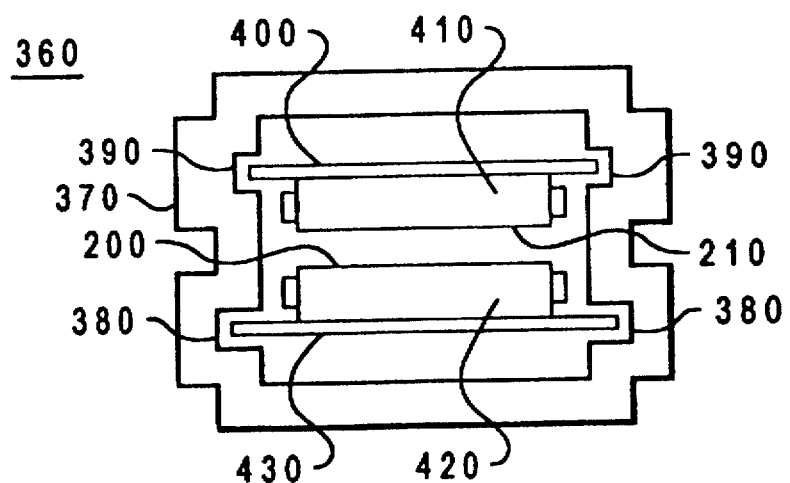

Referring now to FIG. 4B, VMC adaptor 210 is encapsulated in a container 410 having a base forming a peripheral flange 400. Similarly PCMCIA adaptor 280 is encapsulated in a container 420 having a base forming a peripheral flange 430. In operation, flange 430 engages guides 380 to align the connector of PCMCIA adaptor 200 with PCMCIA connector 280. Similarly, flange 400 engages guides 390 to align the connector of VMC adaptor 210 with VMC connector 290. From the above it will be appreciated that socket 360 can receive any of the following:

1. A Type 1, 2 or 3 PCMCIA adaptor 200;
2. A Type 2 VMC adaptor 210;
3. A Type 2 VMC adaptor 210 plus a Type 1 or Type 2 PCMCIA adaptor 200.
4. A Type 3 VMC adaptor 210 which is VMC compatible only; and
5. A Type 3 VMC adaptor 210 which is compatible with both VMC and PCMCIA.

Socket 360 further comprises keying means for preventing PCMCIA adaptor 200 from being plugged into VMC connector 290. The keying means is provided by the differing sizes of guide pairs 380 and 390 and the correspondingly differing sizes of flanges 430 and 400 on adapters 200 and 210 respectively. Specifically, flange 430 is too large to fit into guide pair 390. Therefore, adaptor 200 cannot be inserted towards connector 290. However, flange 400 is smaller enough to fit into both guide pairs 380 and 290. Therefore, subject to Type number, VMC adaptor can be plugged into either VMC connector 290 or PCMCIA connector 280. It will be appreciated that the present invention extends to other keying formats to, for example, prevent VMC adaptor 210 from engaging PCMCIA connector 280 in addition to preventing PCMCIA adaptor 280 from engaging VMC connector 290.

Figure 5A:
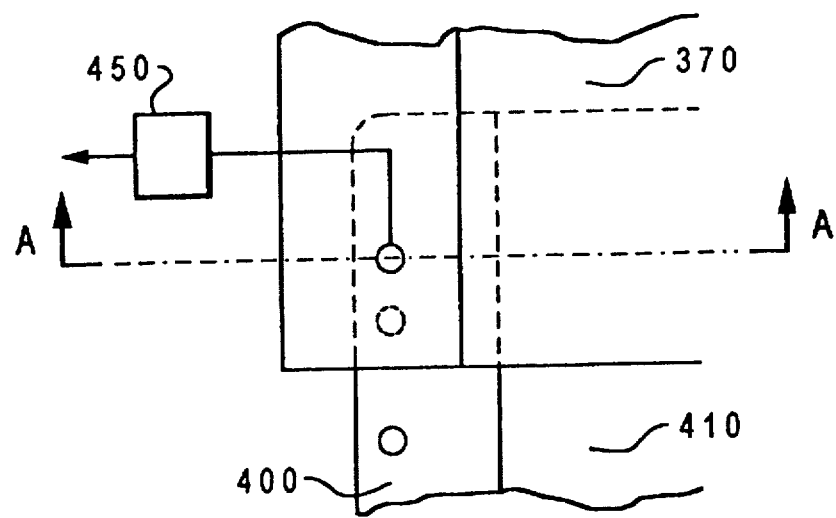
FIGS. 5A and 5B are, respectively, a plan view of the adaptor socket and a cross section along line A—A' through the socket when viewed in the direction of the arrows.

Referring now to FIG. 5A, a modification to the preferred embodiment of the present invention hereinbefore described includes a sensor 450 located in socket 360 for sensing an identification (ID) code from VMC adaptor 210 as it is inserted into guide pair 390 towards VMC connector 290. The ID code identifies the type of VMC adaptor 200. For example, the ID code on an MPEG VMC adaptor differs from the ID code on a games VMC adaptor. The sensed ID is sent by sensor 450 to CPU 30. By examining the ID code received from sensor 450, CPU 30 determines the type of VMC adaptor being connected to system unit 5. If CPU 30 does not recognize the type of VMC adaptor being inserted or if no ID code is detected, for example, in the situation where a PCMCIA adaptor is being inserted towards VMC connector 210, CPU 30 can thus disable VMC bus 180 and issue an error message before, for example, the integrity of data currently in system unit 5 is jeopardized. It will be appreciated therefore, that sensor 450 provides an alternative keying means to the mechanical arrangement hereinbefore described with reference to FIGS. 4A and 4B.

Figure 5B:
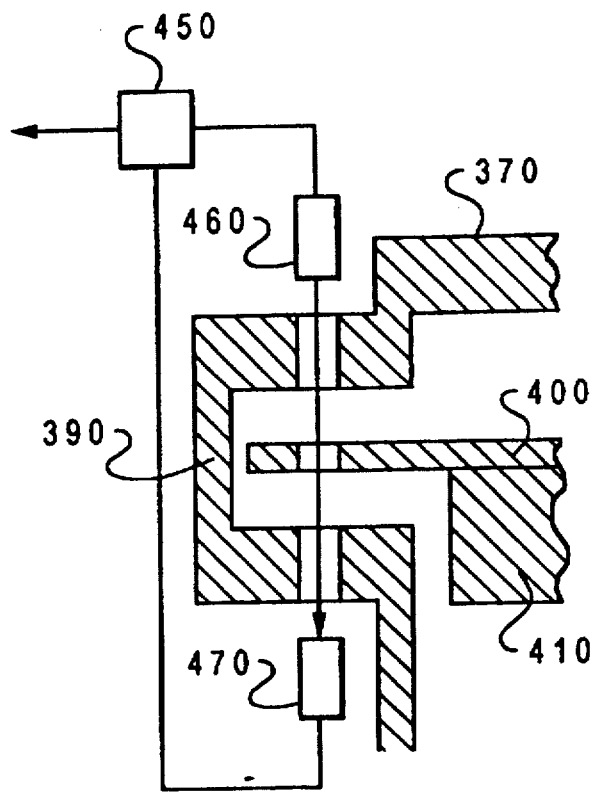

Viewing FIG. 5B, in one embodiment of the present invention, sensor 450 may include a light source 460 and a photo-detector 470 facing each other across a groove of guide pair 390. The ID code is encoded onto VMC adaptor 290 in the form of a sequence of perforations in that part of flange 400 receivable in the groove through which light passes between source 460 and detector 470. As the flange travels along the groove when adaptor 210 is inserted, the ID code is sequentially read by sensor 450. The perforations alternately open and close the light path between source 460 and detector 470. It will be appreciated that in other embodiments of the present invention, sensor 450 may be implemented using different techniques. For example, sensor 450 may alternatively be implemented by a magnetic head for reading data encoded onto a magnetic strip located on either flange 400 or container 410 of adaptor 290. Alternatively, sensor 450 may in the form of an optical bar code reader.

While the invention has been particularly shown and described with reference to a preferred embodiment, it will be understood by those skilled in the art that various changes in form and detail may be made therein without departing from the spirit and scope of the invention.

We claim:

1. An adaptor connection apparatus for a data processing system having at least first and second bus architectures, the adaptor connection apparatus comprising:
   a shell, wherein said shell simultaneously receives and encloses first and second removable adaptors;
   a first electrical contact located in the shell, wherein the first electrical contact connects the first adaptor to the first bus architecture;
   a second electrical contact located in the shell, wherein the second electrical contact connects the second adaptor to the second bus architecture; and
   means for preventing connection of the first adaptor to the second bus architecture, wherein the means for preventing connection includes an identifier sensor that disables the second electrical contact if an identifier corresponding to the second bus architecture is not sensed on an object as the object is received in the shell.

2. The adaptor connection apparatus as claimed in claim 1, wherein the means for preventing connection prevents mechanical interconnection of said first adaptor and said second electrical contact.

3. The adaptor connection apparatus as claimed in claim 1, and further comprising the first adaptor, wherein the first adaptor is a PCMCIA adaptor.

4. The adaptor connection apparatus as claimed in claim 1, wherein the shell is sized to receive only a single third adaptor.

5. An adaptor connection apparatus, comprising:
   a shell, wherein said shell simultaneously receives and encloses a first removable adaptor and a second removable adaptor;
   a first electrical contact located in the shell, wherein the first electrical contact connects the first removable adaptor to the first bus architecture;
   a second electrical contact located in the shell, wherein the second electrical contact connects the second removable adaptor to the second bus architecture;
   means for preventing connection of the first removable adaptor to the second bus architecture: and
   the second removable adaptor, wherein the second removable adaptor is a VESA Media Channel adaptor including:
      a container;
      a VESA Media Channel adaptor circuit within the container; and
      an electrical contact located at one end of the container for contacting the second electrical contact.

6. A data processing system, comprising:
   a housing having an exterior surface, said exterior surface having a recess formed therein;
   a first bus architecture within said housing;
   a second bus architecture within said housing;
   a central processing unit within said housing, wherein said central processing unit is connected to the first bus architecture;
   a video processor within said housing, wherein said video processor is connected to the second bus architecture;
   a shell formed within said recess in said exterior surface of said housing, wherein said shell is capable of simultaneously receiving and enclosing first and second removable adaptors;
   a first electrical contact located in the shell, wherein the first electrical contact connects the first adaptor to the first bus architecture; and
   a second electrical contact located in the shell, wherein the second electrical contact connects the second adaptor to the second bus architecture.

7. The data processing system as claimed in claim 6, and further comprising means for preventing connection of the first adaptor to the second bus architecture.

8. The data processing system as claimed in claim 7, wherein the means for preventing connection prevents mechanical connection between said first adaptor and said second electrical contact.

9. The data processing system as claimed in claim 7, wherein the means for preventing connection comprises an identifier sensor, wherein the identifier sensor disables the second electrical contact if an identifier corresponding to the second bus architecture is not sensed on an object as the object is received in the shell.

10. The data processing system as claimed in claim 6, and further comprising the first adaptor, wherein the first adaptor is a PCMCIA adaptor.

11. The data processing system as claimed in claim 6, and further comprising the second adaptor, wherein the second adaptor is a VESA Media Channel adaptor.

12. The data processing system as claimed in claim 11, wherein the VESA Media Channel adaptor comprises:
    a container;
    a VESA Media Channel adaptor circuit within the container; and
    an electrical contact located at one end of the container for contacting the second electrical contact.

13. The data processing system as claimed in claim 6, wherein the first bus architecture is a system bus architecture and the second bus architecture is a VESA Media Channel.

14. The data processing system as claimed in claim 6, wherein the shell is sized to receive only a single third adaptor.

15. A display apparatus, comprising:
    a body;
    a display device mounted in the body;
    a data processing system releasably mountable in the body;
    means for connecting the data processing system to the display device when the data processing system is mounted in the body;
    said data processing system including:
       a housing having an exterior surface, said exterior surface having a recess formed therein;
       a first bus architecture within said housing;

a second bus architecture within said housing;

a shell formed within said recess in said exterior surface of said housing, wherein said shell is capable of simultaneously receiving and enclosing first and second removable adaptors;

a first electrical contact located in the shell, wherein the first electrical contact connects the first adaptor to the first bus architecture; and a second electrical contact located in the shell, wherein the second electrical contact connects the second adaptor to the second bus architecture.

16. The display apparatus as claimed in claim 15, and further comprising means for preventing connection of the first adaptor to the second bus architecture.

17. The display apparatus as claimed in claim 16, wherein the means for preventing connection prevents mechanical connection between said first adaptor and said second electrical contact.

18. The display apparatus as claimed in claim 16, wherein the means for preventing connection comprises an identifier sensor, wherein the identifier sensor disables the second electrical contact if an identifier corresponding the second bus architecture is not sensed on an object as the object is received in the shell.

19. The display apparatus as claimed in claim 15, and further comprising the first adaptor, wherein the first adaptor is a PCMCIA adaptor.

20. The display apparatus as claimed in claim 15, and further comprising the second adaptor, wherein the second adaptor is a VESA Media Channel adaptor.

21. The display apparatus as claimed in claim 20, wherein the VESA Media Channel adaptor comprises:

a container;

a VESA Media Channel adaptor circuit within the container; and an electrical contact located at one end of the container for contacting the second electrical contact.

22. The display apparatus as claimed in claim 15, wherein the shell is sized to receive only a single third adaptor.

* * * * *